United States Patent [19]
Sakai et al.

[11] Patent Number: 5,270,873
[45] Date of Patent: Dec. 14, 1993

[54] SIGNAL RECORDING AND EDITING APPARATUS

[75] Inventors: Seiichi Sakai, Tokyo; Yasuo Iwasaki, Kanagawa, both of Japan

[73] Assignee: Sony Corporation, Tokyo, Japan

[21] Appl. No.: 795,505

[22] Filed: Nov. 21, 1991

[30] Foreign Application Priority Data

Nov. 27, 1990 [JP] Japan .................. 2-327200

[51] Int. Cl.$^5$ .............................................. H04N 5/78
[52] U.S. Cl. ................... 360/36.1; 360/14.1; 360/27; 360/73.11
[58] Field of Search .................. 360/13, 14.1, 27, 70, 360/71, 73.01, 73.04, 73.09, 73.11, 73.12, 73.13, 73.14, 75, 77.01, 77.12, 77.13, 77.14, 77.15, 72.2; 358/335, 337

[56] References Cited

U.S. PATENT DOCUMENTS 4,782,403  11/1988  Hasegawa et al. .................... 360/66
5,026,509   6/1991  Arai et al. ......................... 360/77.15
5,148,331   9/1992  Kashida et al. ..................... 360/77.15

FOREIGN PATENT DOCUMENTS 0213937  3/1987  European Pat. Off. ......... 360/77.15
0240217  10/1987  European Pat. Off. .
0191164  10/1984  Japan .............................. 360/77.14

Primary Examiner—Andrew L. Sniezek
Attorney, Agent, or Firm—William S. Frommer; Alvin Sinderbrand

[57] ABSTRACT

In a signal recording apparatus, a signal recording track and a tracking error detection track are formed in the predetermined positions of a recording track in ordinary recording. In editing and recording, an editing recording track is formed on the basis of the tracking error detection track, thereby it is possible to restrict a deviation of tracking to a predetermined amount even when editing work is repeated in a case where tracking deviation occurs at a start of editing work.

7 Claims, 6 Drawing Sheets

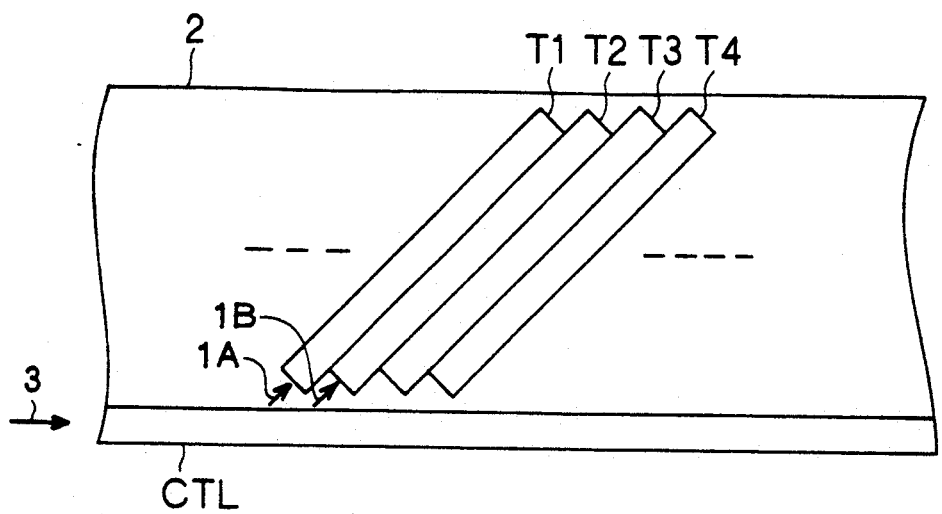
FIG. 1
(PRIOR ART)
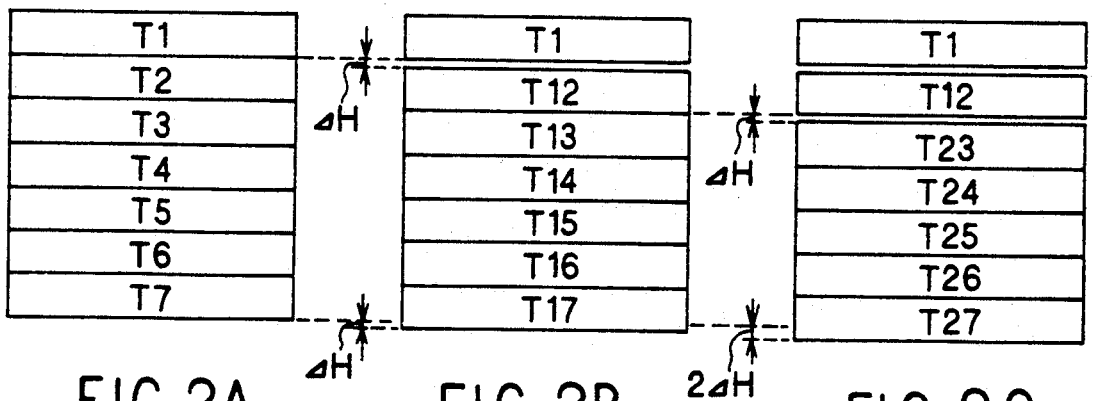
FIG. 2A
(PRIOR ART)
FIG. 2B
(PRIOR ART)
FIG. 2C
(PRIOR ART)

SIGNAL RECORDING AND EDITING APPARATUS

BACKGROUND OF THE INVENTION

This invention relates to a signal recording apparatus, and is particularly usable in editing a video image recorded on a magnetic tape.

As shown in FIG. 1, in a conventional video tape recorder, magnetic heads 1A, 1B scan a magnetic tape 2 which is longitudinally fed obliquely to form recording tracks T1, T2, ...

Further, a control track CTL is formed by a control head 3 in a bottom end of the magnetic tape 2.

Field images are sequentially formed on the recording tracks T1, T2, ... by the magnetic heads 1A, 1B and a control signal is recorded in the control track CTL in response to a commencement of recording of the recording tracks T1, T2 ...

In reproduction, the video tape recorder responds to a level of reproduction RF signal detected by the magnetic heads 1A, 1B scanning the recording tracks T1, T2 ... to control such that the magnetic heads 1A, 1B scan the recording tracks T1, T2, ... without deviation therefrom.

That is, the video tape recorder detects a deviation of the magnetic heads 1A, 1B from the recording tracks T1, T2, ... by a variation of a signal level of the RF signal and sends a control signal for controlling phase of the control signal detected through the control heads 3 to a capstan motor to control a rotational phase of the capstan motor.

A running speed of the magnetic tape 2 is corrected by the rotational phase of the capstan motor and the video tape recorder controls the magnetic heads 1A, 1B such that they scan the recording tracks T1, T2, ... without deviation.

When an image recorded on the magnetic tape 2 is edited, the video tape recorder positions the magnetic heads 1A, 1B in edition start tracks on the basis of a detection level of the RF signal detected by a recording track (referred to as edition start preceding track, hereinafter) which precedes by 1 track a recording track (referred to as edition start track, hereinafter), among the editing and recording tracks T1, T2, ..., corresponding to an assigned editing point and records the edited image (FIG. 2A).

In FIGS. 2A to 2C, the tracks formed obliquely on the tape is illustrated schematically so as to be in a row vertically.

However, there may be a case where a tracking error $\Delta H$ of the magnetic heads to the edition start track of the edition image is produced by a detection error of the control signal due to extension of the magnetic tape 2 and/or an error due to a relation between a track width and a gap width of the magnetic head.

When the edition start track corresponds to the recording track T2, the edition track after the edition start deviates by $\Delta H$ with respect to the edition start track 2 as shown in FIG. 2B and edition tracks T12, T13, T14, ... are formed sequentially from this position.

Further, when a recording of another image signal is started with the edition track T13 as a second edition start track, the edition tracks T23, T24, T25, ... after the second edition deviate with respect to the edition start track T13 by $\Delta H$, as shown in FIG. 2C.

At this time, the edition tracks T23, T24, T25 after the second edition deviate by $2 \times \Delta H$ with respect to unedited recording tracks T3, T4, T5, ...

Similarly, the deviation is accumulated with repetitive edition works and, after N editions, recording tracks TNM, TNM+1, TNM+2, ... may deviate by $N \times \Delta H$ with respect to unedited recording tracks TM, TM+1, TM+2, ...

Such tracking deviation causes an image disturbance on a screen when a peripheral portion of an editing point is reproduced by the video tape recorder.

SUMMARY OF THE INVENTION

In view of the foregoing, an object of this invention is to provide a recording apparatus which is capable of restrict such backing deviation of the editing tracks within a predetermined range and of preventing image disturbance from occurring even if a portion around an editing image point is reproduced.

The foregoing objects and other objects of the invention have been achieved by the provision of a signal recording apparatus 10 in which, by running magnetic heads 13A, 13B in a slanted relation to a magnetic tape 2 running longitudinally, a recording signal is recorded sequentially on recording tracks T1, T2, ... formed by locuses of the magnetic heads 13A, 13B forms, in an ordinary recording, signal recording tracks TV1, TV2, ... and tracking error detection tracks TE1, TE2, ... in predetermined positions of the recording tracks T1, T2, and records, in editing and recording, an editing recording signal in the editing and recording tracks TV11, TV12, ... on the basis of the tracking error detection tracks TE1, TE2, ...

In an ordinary recording, the tracking error detection tracks TE1, TE2, ... are recorded, together with the signal recording tracks TV1, TV2, ..., and, in an edition and recording, the tracking of the editing recording tracks TV11, TV22, ... is matched on the basis of the tracking error detection tracks TE1, TE2, ... and the editing recording tracks TV11, TV22, ... are recorded without erasing the tracking error detection tracks TE1, TE2, ...

By this, in a case where, in the edition recording, there is a tracking error occurred in recording the edition recording signal, and when a plurality of editing operations are repeated, it is possible to restrict deviation between the editing recording tracks TV11, TV12, ... after edited a plurality of times and the recording tracks T1, T2, ... when not edited to a predetermined value $\Delta H$.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 1 shows conventional recording tracks;

FIGS. 2A to 2C show conventional recording tracks after edited;

DETAILED DESCRIPTION OF THE INVENTION

Figure 3:
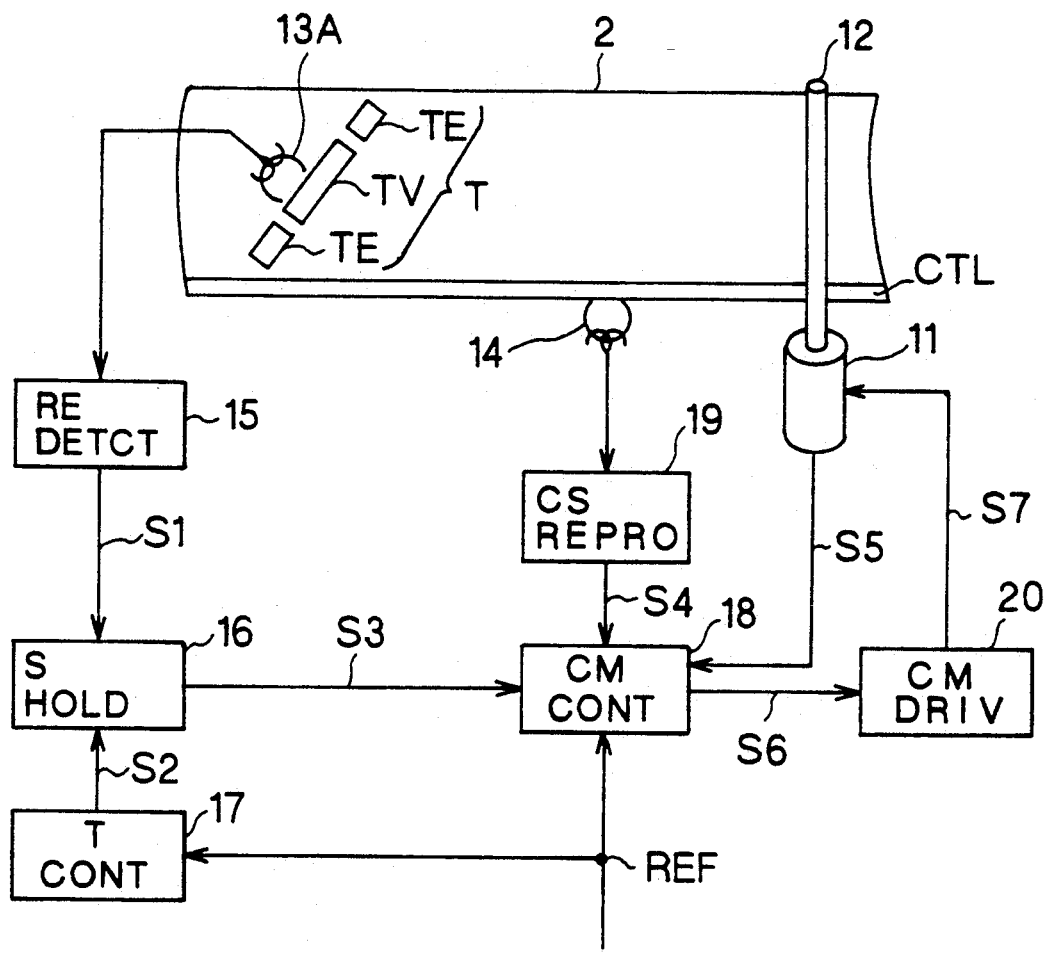
FIG. 3 is a block diagram showing an embodiment of a signal recording apparatus according to the present invention.

Preferred embodiments of this invention will be described with reference to the accompanying drawings:

In FIG. 3, a video tape recorder 10 causes a magnetic tape 2 to run longitudinally by a capstan 12 which is driven by a capstan motor 11.

The magnetic tape 2 is wound on a rotary drum obliquely so that slanted recording tracks T are formed by magnetic heads 13A, 13B arranged on the rotary drum 13X.

Figure 4:
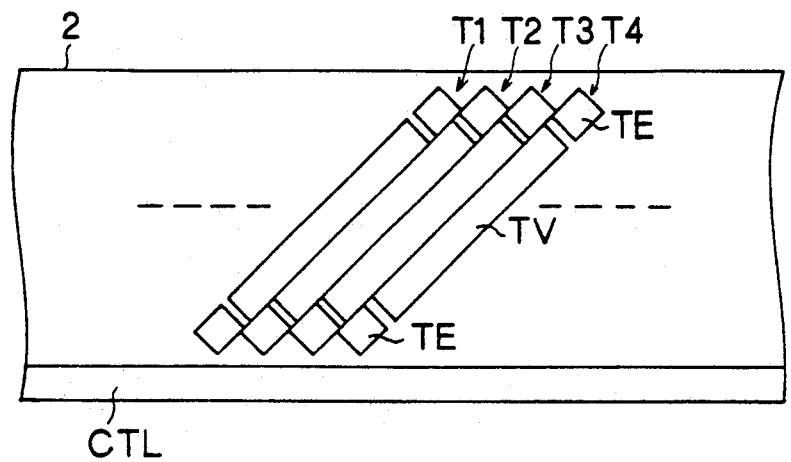
FIG. 4 is a plan view showing a format of recording tracks formed according to the present invention.

The recording tracks T are recorded sequentially by the magnetic heads 13A, 13B and have tracking error detection tracks TE on both sides of each image recording track TV, as shown in FIG. 4. It is noted that only the magnetic head is illustrated for convenience in FIG. 3.

A control track CTL is formed on and along a lower edge of the magnetic tape 2 by means of a control head 14.

On the other hand, in an editing and recording, the magnetic heads 13A, 13B do not erase the tracking error detection tracks TE but use them to match the tracking and only the editing recording tracks TV1, TV2, . . . are recorded.

Here, a pilot signal which cyclically changes every track is recorded in the tracking error detection tracks TE and, based on such pilot signal, the trackings of the magnetic heads 13A, 13B are matched.

A reproduction envelope detectional circuit 15, in reproduction, detects an envelope of a reproduction RF signal obtained from the tracking error detection tracks TE by means of the magnetic heads 13A, 13B and outputs an envelope signal S1 to a sample-hold circuit 16.

The sample-hold circuit 16 sample-holds the envelope signal S1 at a timing of a timing signal inputted from a timing control circuit 17. Since the envelope signal S1 induces envelope constituents obtained by reproducing the tracking error detection tracks TE allocated in the front of and in the rear of the video recording track TV, the two envelope constituents are sample-hold by the timing signal S2. Thus obtained sample value STE1 for the front side tracking error detection track and the sample value STE2 for the rear side tracking error detection track are sent to a motor control circuit 18 as the error detection signal S3.

The timing control circuit 17, when receives a reference signal REF, outputs the timing signal S2 to the sample-hold circuit 16 with a predetermined timing.

The capstan motor control circuit 18, when receives the reference signal REF as well as a control signal S4 from a control signal reproduction circuit 19, the error detection signal S3 from the sample-hold circuit 16 and a frequency signal S5 from the capstan motor 11 outputs a rotation control signal S6 for controlling rotational speed and phase of the capstan motor 11 to a capstan motor drive circuit 20.

The control signal reproduction circuit 19 reproduces the control signal S4 from the control track CTL through the control head 14 and outputs it to the capstan motor control circuit 18.

The capstan motor drive circuit 20 outputs a drive signal S7 to the capstan motor 11 on the basis of the phase control signal S6 to control rotation of the capstan motor 11 to thereby control a running speed such that the magnetic heads 13A and 13B scan centers of the recording tracks T.

Figure 6:
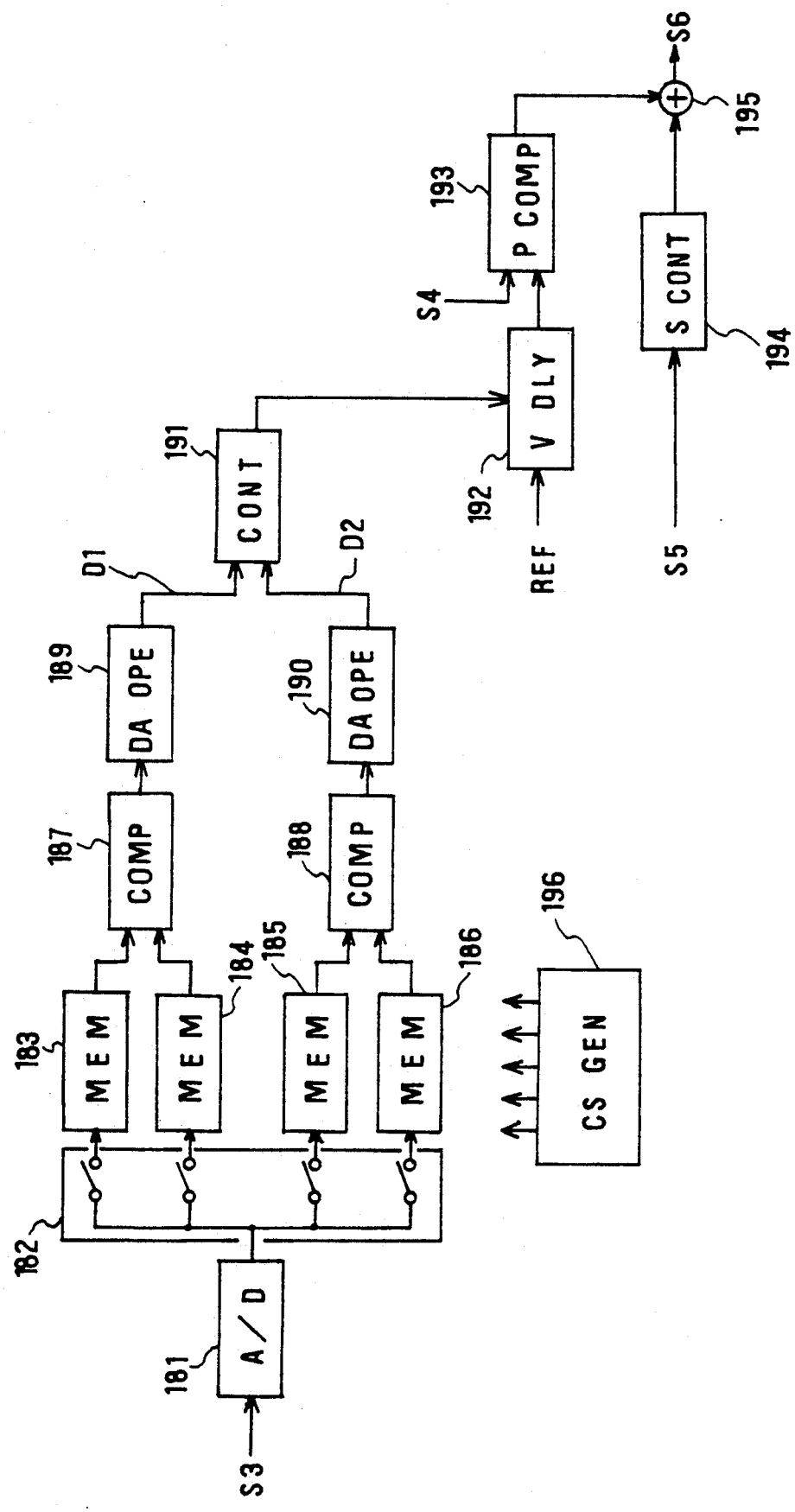
FIG. 6 is a block diagram showing the detail of the capstan motor control circuit.

Subsequently the capstan motor control circuit 18 is explained in a detail with reference to FIG. 6.

An analog/digital converter 181 converts the error detection signal S3 into a digital signal. The error detection signal S3 includes the sample value TE1 corresponding to the tracking error detection track TE allocated in the front of the video recording track TV and the sample value TE2 corresponding to the tracking error detection track TE allocated in the rear of the video recording track. The analog to digital converter 181 converts these sample values STE1, STE2 into digital values. The digital sample values DTE1, DTE2 is sent to memories 183, 184, 185 and 186 through a switching circuit 182.

The switching circuit 182 is controlled by a control signal from a control signal generation circuit 196 so as to input alternately the one sample value DTE1 of the digital sample values DTE1 and DTE2 into memories 183 and 184 as well as input alternately the other sample value DTE2 of the digital sample values DTE1 and DTE2 into memories 185 and 186. As a result, the digital sample value DTE1 reproduced from a present track (i.e. a track which is reproduced presently) and the digital sample value DTE2 reproduced from a just preceding track (i.e. a track which has been reproduced one track before) are wrote into the memories 183 and 184 respectively. The digitalized sample value DTE2 sampled from the present track and the digitalized sample value DTE1 sampled from the just preceding track also are wrote into the memories 185 and 186 respectively. A comparison circuit 187 and 188 compare with the digital sample value DTE1 and DTE1', DTE2 and DTE2' respectively in a relative magnitude. This comparison operation is performed by referring the digital sample value DTE1 and DTE2 obtained newly at all times so that it is compared whether data obtained presently is larger than data obtained from the just preceding track or not.

A delay amount operation circuit 189 and 190 perform a operation of amount of delay in a variable delay circuit 192 which controls a reproducing phase of a control signal S4. If the outputs of the comparison circuits 187 and 188 represent that the data obtained from the present track is larger than the data obtained from the just preceding track, the delay amount operation circuits 189 and 190 output new amount of delay D which is representative of equation (1);

(amount of delay D' of the last operation)+(amount of delay ΔD predetermined)     (1)

On the contrary, if the outputs of the comparison circuits 187 and 188 represent that the data obtained from the present track is smaller than the data obtained from the just preceding track, the delay amount operation circuits 189 and 190 output new amount of delay D which is representative of equation (2);

(the amount of delay D' of the last operation) − (the amount of delay ΔD predetermined)     (2)

Figure 7:
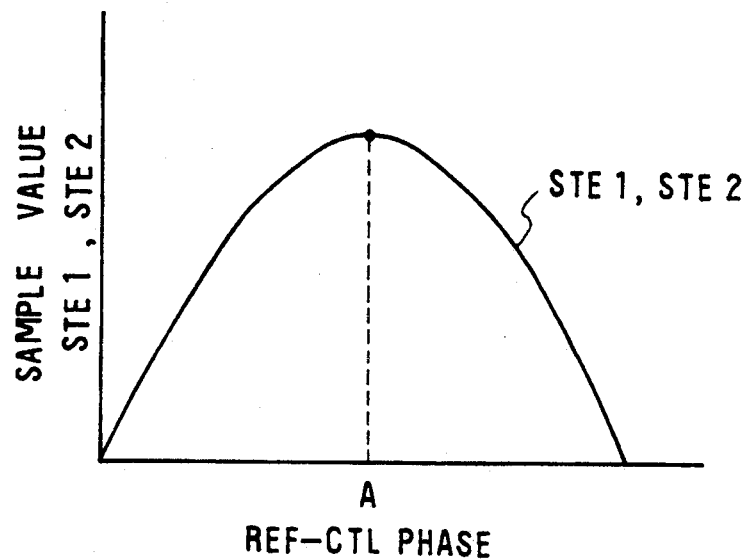
FIG. 7 is a graph showing a relationship between a sample value and a phase of a reference signal/a control signal in a case where there is no curvature in a recording track.
Figure 8:
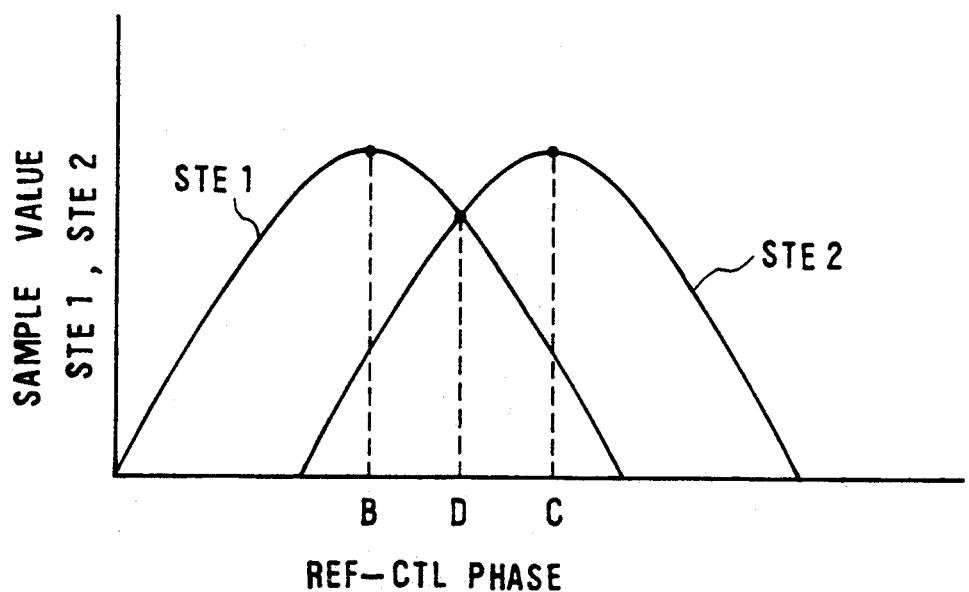
FIG. 8 is a graph showing a relationship between the sample value and the phase of the reference signal/the control signal in a case where there is curvature in a recording track.

Assuming that the amount of delay D based on the sample value STE1 is D1 and the amount of delay based on the sample value STE2 is D2, the amount of delay D1 and D2 become equal each other, because the sample values STE1 and STE2 have an equal value each other in a case where there is no curvature in a recording track. FIG. 7 illustrates in thus case. In this state, the relationship between the sample values STE1 and STE2 and the phase of the reference signal REF to the control signal S4 (i.e. a phase which is a phase difference between the reference signal REF and the control signal S4, or REF-CTL phase) are nearly equal, and a tracking state is the best at a phase A. However in a case where there is curvature in the recording track, the sample value STE1 and STE2 become not equal and then the amount of delay D1 and D2 also become not equal. FIG. 8 illustrates in thus case. In this state, the relationship between the sample values STE1 and STE2 and the phase of the reference signal REF to the control signal S4 become different. Therefore when the tracking control is performed on the basis of the sample value STE1, the phase of the reference signal REF to the control signal S4 is controlled at a phase B, as a result a tracking state for the tracking error detection track in front of the video recording track TV is the best but a tracking state for the tracking error detection track in rear of the video recording track TV deviates. On the contrary, when the tracking control is performed on the basis of the sample value STE2 the phase of the reference signal REF to the control signal S4 is controlled at a phase C, as a result the tracking state for the tracking error detection track in rear of the video recording track TV is the best but the tracking state for the tracking error detection track in front of the video recording track TV deviates.

To be solved the inconvenience as described above, amount of delay of a variable delay circuit 192 is determined corresponding to the output values of the delay amount operation circuits 189 and 190 by performing the operation in the control circuit 191. That is, when the amount of delay D1 and D2 are nearly equal each other within certain range, the amount of delay is outputted as the control signal for the variable delay circuit 192. Thereby the reference signal REF is delay-controlled so that the phase of the reference signal REF to the control signal S4 is the phase A and then the best tracking state is obtained. But when the amount of delay D1 and D2 are different each other over the certain range, a weighted mean value of the amount of delay D1 and D2 is outputted to the variable delay circuit 192 as control signal. As a result, as shown in FIG. 8, the reference signal REF is delay-controlled so that the phase of the reference signal REF to the control signal S4 is the phase D and then the best tracking state is obtained.

A phase comparison circuit 193 detects a phase difference between the reference signal REF and the control signal S4 delay-controlled as described above.

The rotating speed of the capstan motor 11 is controlled by means of a speed control circuit 194 on the basis of the frequency signal S5 generated corresponding to the rotation of capstan motor 11.

The outputs of the phase comparison circuit 193 and the speed control circuit 194 are added in the adding circuit 195 to output the adding result as the rotation control signal S6 which is sent to a capstan motor driving circuit. Thereby the rotation speed and the phase of the capstan motor are controlled to tracking-control in optimum conditions.

In the construction as described above, the video tape recorder 10, in ordinary recording, sequentially records the video recording tracks TV as well as the tracking error detection tracks TE on the magnetic tape 2 through the magnetic heads 13A and 13B.

Figures 9A, 9B, 9C:
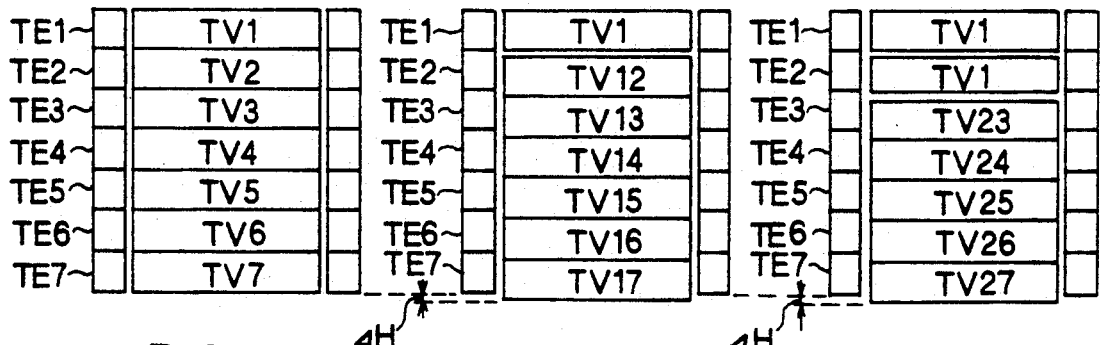
FIGS. 9A to 9C show recording tracks after edited.
Figure 5:
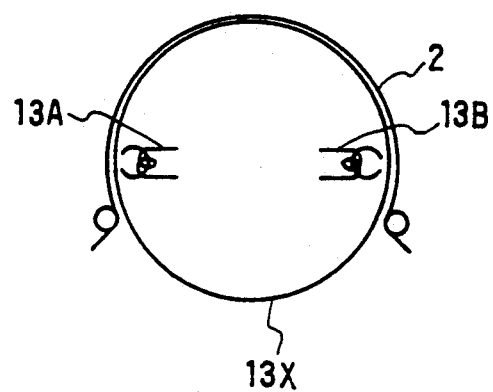
FIG. 5 is a schematic view showing the arrangement of magnetic heads.

At this time, in the tracking error detection tracks TE, the pilot signal which is cyclically changes is recorded and a video signal is recorded on the video recording tracks TV, sequentially (FIG. 9A).

And, at this time, the video tape recorder 10 records a control signal corresponding to a recording start timing of the recording track T on the control track CTL through the control head 14.

After a termination of such ordinary recording, the video tape recorder 10 is switched to an edition mode and when an edition start point is assigned, the video tape recorder 10 rewinds the magnetic tape 2 to a position preceding, in time, to the edition start point to start the tracking matching of the magnetic heads 13A and 13B.

At this time, the video tape recorder 10, when detects an amount of deviation of the magnetic heads 13A and 13B from the tracking error detection track TE in the capstan motor control circuit 18 after through sequentially the magnetic heads 13A and 13B, the reproduction envelope detection circuit 15 and the sample-hold circuit 16, controls the rotation of the capstan motor 11 through the capstan motor control circuit 20 such that the magnetic heads 13A and 13B scan the centers of the recording tracks T to thereby control the running speed of the magnetic tape 2.

Eventually, the video tape recorder 10 is switched to the edition and recording with the timing of the edition start point.

The video tape recorder 10, when matches the trackings of the magnetic heads 13A and 13B by the tracking error detection (referred to as edition start tracking error detection track, hereinafter) TE2 corresponding to the edition start point, forms an edition track TV2 (FIG. 9B) and records the edited video signal.

At this time, assuming that there is a tracking error ΔH occurred, the edition track TV12 deviates from the tracking error detection track TE2 by ΔH.

The recording tracks TV12, TV13, . . . after edited are deviated in track by ΔH as a whole, as shown in FIG. 9B.

After such, the video tape recorder 10 terminates the recording of the edited video signal at an edition end point.

Further, when, for example, an edition track T13 which succeeds the first edition start point T2 by 1 track is assigned as a second edition start point, the video tape recorder 10 waits for a tracking error detection track TE corresponding to the second edition start point.

Here, the video tape recorder 10 is switched to the edition and recording mode with the timing of the second edition start point.

The video tape recorder 10, when matches the trackings of the magnetic heads 13A and 13B by the tracking error detection track TE3 corresponding to the edition start point in the similar manner to the mentioned, records sequentially the twice edited recording tracks TV23, TV24, . . . and terminates the recording at a predetermined end point.

At this time, when the tracking error ΔH occurs, the twice edited recording tracks TV23, TV24, . . . deviate from the tracking error detection track TE3 by ΔH.

However, as shown in FIG. 9C, the second edition tracks TV23, TV24, TV25, . . . deviate in tracking from the recording tracks which are unedited by only ΔH.

Similarly, since the edition and recording tracks after edited n times are matched every time with respect to the tracking error detection tracks which are recorded in the ordinary recording, the tracking deviation after edition is merely ΔH for every recording track when unedited, and the errors are not accumulated every time as in the conventional case, as a whole.

By this, even when there is an error ΔH in tracking of the video tape recorder 10, the deviation of tracking in the edition and recording does not depend upon the number of editions and can be restricted to a minimum deviation ΔH.

With the construction mentioned hereinbefore, in which, when the video recording tracks TV are formed in the ordinary recording, the tracking error detection tracks TE are simultaneously recorded on both sides of the video recording tracks TV and, in the edition and recording, the edition and recording tracks TV are recorded from the edition start point on the basis of such tracking error detection tracks TE, it is possible to restrict every tracking deviation to the minimum amount even when an error ΔH is included in the tracking of the video tape recorder and thus it is possible to effectively prevent distortion of image around the edited point from occurring.

In the above mentioned embodiment, although it has been described that the control track CTL is formed in the lower edge of the magnetic tape 2, the present invention is not limited thereto, and, by recording the control signal in the tracking error detection track TE, it is possible to eliminate the longitudinal control track CTL to thereby make an effective use of the tape width of the magnetic tape 2.

Further, in the above described embodiment, although the tracking error detection tracks TE are formed on the front side and the rear side of the recording tracks TV and the pilot signal is recorded, the present invention is not limited thereto and it is possible to record it in other portions.

Further, in the above described embodiment, although, as the pilot signal, the frequency signal which changes cyclically is recorded in the tracking error detection tracks TE, the present invention is not limited thereto and it is possible to record a signal whose pattern depends upon track and correct the amount of tracking deviation on the basis of a reproduction signal level thereof.

Further, in the above described embodiment, although the pilot signal recorded on the tracking error detection tracks TE is recorded or reproduced by the magnetic heads 13A and 13B, the present invention is not limited thereto, and it is possible to record or reproduce by a specially provided magnetic head.

Further, in the above described embodiment, although the case applied to the video tape recorder has been described, the present invention is not limited thereto and is applicable to other editing and recording apparatus.

As described hereinbefore, according to the present invention, in which, in an ordinary recording, a signal recording track and tracking error detection track are formed in predetermined positions of the recording track, and, in editing and recording, an editing recording signal is recorded in the editing and recording track on the basis of the tracking error detection track, it is possible to obtain a recording apparatus which is capable of restricting error between the recording tracks after edited a plurality of times and the recording tracks which are not edited to a predetermined amount of deviation, even when there is a tracking error in tracking of the edition start point in every edition.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A signal recording and editing apparatus in which a servo-control apparatus is provided for controlling a running speed of a magnetic tape driven by tape drive means and, in an ordinary recording mode, slanting recording tracks are formed on the magnetic tape to record a recording signal by means of a rotary magnetic head, and position information which represents the positions of said slanting recording tracks is recorded on a longitudinal track of said magnetic tape by means of a stationary magnetic head, and in which, in an editing mode, the running phase of said magnetic tape is controlled on the basis of said position information reproduced from said longitudinal track and a reference signal, and the contents of a predetermined slanting recording track are rewritten, comprising:

means for generating an error detection signal to detect an error corresponding to a deviation between said slanting recording track and said rotary magnetic head;

error detection signal recording means for recording said error detection signal on an assigned track corresponding to said slanting recording track during said ordinary recording mode;

error detection signal reproducing means for reproducing during said editing mode said error detection signal;

detection means for detecting a tracking deviation of said assigned track on the basis of an output signal derived from the reproduced error detection signal during said editing mode;

variable delay means for delaying said reference signal by an amount corresponding to the detected tracking deviation of said assigned track in said editing mode; and phase comparison means for phase-comparing an output of said variable delay means and said reproduced position information to control said tape drive means;

in which said signal recording apparatus tracking-controls in said editing mode on the basis of said error detection signal recorded previously without re-writing said error detection signal that has been recorded on said assigned track in said ordinary recording mode thereby preventing cumulative tracking deviations during editing.

2. The signal recording and editing apparatus according to claim 1, in which said assigned track is formed by said rotary magnetic head or an assigned head corresponding to said slanting recording track.

3. The signal recording and editing apparatus according to claim 2, in which said tracking deviation detection means comprises:
- means for storing a reproducing level obtained by scanning said assigned track and a reproducing level obtained by a previous scan of said assigned track;
- means for comparing said reproducing level obtained by scanning said assigned track and said reproducing level obtained from said previous scan of said assigned track as supplied from said storing means; and
- control means for controlling the delay of said variable delay means on the basis of said comparing means.

4. The signal recording and editing apparatus according to claim 1, in which said assigned track is at least two tracks formed by said rotary magnetic head or an assigned head corresponding to said slanting recording track.

5. The signal recording and editing apparatus according to claim 4, in which said assigned track has two tracks, a first track allocated on one side of said slanting recording track and a second track allocated on the other side of said slanting recording track.

6. The signal recording and editing apparatus according to claim 5, in which said tracking deviation detection means comprises:
- first memory means for storing a reproducing level obtained by scanning said first track and a reproducing level obtained from a previous scan of said first track;
- second memory means for storing a reproducing level obtained by scanning said second track and a reproducing level obtained from a previous scan of said second track;
- first comparison means for comparing the stored reproducing level obtained from the scanning of said first track and the stored reproducing level obtained from the previous scan of said first track output from said first memory means;
- second comparison means for comparing the stored reproducing level obtained from the scanning of said second track and the stored reproducing level obtained from the previous scan of said second track output from said second memory means;
- first operation means for establishing the delay of said variable delay means on the basis of said first comparison means;
- second operation means for establishing the delay of said variable delay means on the basis of said second comparison means; and
- control means for controlling the delay of said variable delay means on the basis of said first and second operation means.

7. The signal recording and editing apparatus according to claim 6, wherein said control means provides one of the delays established by said first and second operation means to said variable delay means when the difference between the delays established by said first and second operation means is within a predetermined range, and said control means provides a weighted mean value of the delays established by said first and second operation means to said variable delay means when the difference between the delays established by said first and second operation means is outside said predetermined range.

* * * * *